US007707700B1

(12) United States Patent
Lapetina

(10) Patent No.: US 7,707,700 B1
(45) Date of Patent: May 4, 2010

(54) RAPID ACCESS TOOL

(76) Inventor: TroyHunter Lapetina, 2635 Lake Powell Rd., Williamsburg, VA (US) 23185

( * ) Notice: Subject to any disclaimer, the term of this patent is extended or adjusted under 35 U.S.C. 154(b) by 0 days.

(21) Appl. No.: 12/462,028

(22) Filed: Jul. 28, 2009

(51) Int. Cl.
*B23P 19/02* (2006.01)

(52) U.S. Cl. .............................. 29/25; 29/261; 29/278; 29/280; 29/283.5

(58) Field of Classification Search .................. 29/251, 29/255, 244, 261, 278, 280, 283.5
See application file for complete search history.

(56) References Cited

U.S. PATENT DOCUMENTS 2,584,124 A * 2/1952 Gustafson .................... 294/97
3,132,890 A * 5/1964 Beaudet ..................... 294/86.4
3,583,753 A * 6/1971 McCrory ................... 294/86.4
5,178,427 A * 1/1993 Jorritsma ................. 294/82.36
5,332,272 A * 7/1994 Prince ......................... 294/97
5,613,721 A * 3/1997 Mullins ..................... 294/82.1
5,769,475 A * 6/1998 Tylaska ..................... 294/82.2

* cited by examiner

*Primary Examiner*—Lee D Wilson
(74) *Attorney, Agent, or Firm*—Bambie Faivre Walters; Lisa Velez

(57) ABSTRACT

An exemplary embodiment of the tool comprises an elongated shaft having a longitudinal axis and a first portion with a first end and a second portion with a second end, the second portion having an elongated aperture or slot. The tool includes a pull line attachment assembly coupled to the elongated shaft, the pull line attachment assembly being configured to couple to a pull line or strap. The tool also provides a self-orienting pull arm pivotally coupled within the elongated shaft and being configured to automatically latch and be concealed within said elongated shaft. The pull arm is configured to automatically orient to a deployed state under a force of gravity after the elongated shaft has been inserted through a barrier. The pull arm, when in the deployed state, is configured to apply pressure to the barrier to breach the barrier. Methods are described for using the tool to breach a barrier or ballistic material of an enclosed chamber.

20 Claims, 8 Drawing Sheets

RAPID ACCESS TOOL

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

I. Field

This invention generally relates to the field of tools, such as for first responders.

II. Background

Vehicle crashes and other emergency scenarios involving ballistic vehicles, or alternatively structures designed to defeat armed assaults from gunfire and explosive devices, present a unique challenge to rescuer providers. First responders and military personnel (also referred to herein as "rescue provider") are often called upon to rapidly extricate individuals from within armored vehicles or structures and are limited to very few options for completing the extrication task. In addition, the safety of the individuals may be compromised in the extrication process.

Conventional approaches have failed to solve these aforementioned problems. For example, one approach is to use of power saws (e.g., a K-12, chain saw, or circular saw) to cut into the vehicle. However, this requires that the rescue provider have the saw in his/her possession at the time of need. Moreover, the saw must have the proper cutting blade already installed. If the saw is gasoline powered, then the saw must be fueled and ready for use at all times. This technique and method often places the victim(s) at greater risk for additional injuries from exposed cutting edges of the tools being used, respiratory injury from airborne particulate created from the cutting and grinding, and impact injuries from falling material that may enter the occupant space of the vehicle once the cut has been completed.

Another conventional rescue technique involves the use of "Halligan" bar and sledge hammer. However, this rescue technique requires that the rescue provider have the "Halligan" bar and sledge hammer in his/her possession at the time of need. This process also requires a significant amount of time and energy to eventually begin to breach the ballistic material. The rescue provider will need additional personnel to help leverage the ballistic material to the point of displacement or removal. And, the weight of such material may require additional equipment or rigging to safely remove the material thus minimizing unintended injuries to rescuers and/or victims.

In addition to the above mentioned shortcomings, many of the above techniques are not readily portable for rescue providers and require a great deal of labor. Another shortcoming is that conventional ballistic rescue tools tend to be large, bulky, and/or dangerous, and, thus, create a potential hazard when the technician transports the device.

SUMMARY

The aforementioned problems, and other problems, are reduced, according to exemplary embodiments, by the tool, apparatuses and methods for a breaching ballistic material or barriers such as by first responders.

According to an exemplary embodiment, a tool comprises an elongated shaft having a longitudinal axis and a first portion with a first end and a second portion with a second end, the second portion having an elongated aperture or slot. The tool includes a pull line attachment assembly coupled to the first end, the pull line attachment assembly being configured to couple to a pull line or strap. The tool also includes a pin coupled to the elongated shaft within the elongated aperture or slot. The tool also provides a self-orienting pull arm pivotally coupled within the elongated aperture or slot and being configured to automatically latch to the pin to conceal and hold the self-orientating pull arm, when the elongated shaft is in a first predetermined orientation, and being configured to automatically orient to a deployed state from the first predetermined orientation under a force of gravity when the elongate shaft is rotated to a second predetermined orientation. The pull arm, when concealed, has a longitudinal axis which is parallel with the longitudinal axis of the elongated shaft and, when in the deployed state, the longitudinal axis of the pull arm is angled greater than 0° with respect to the longitudinal axis of the elongated shaft.

According to an exemplary embodiment, a method of breaching a barrier using a rapid access tool is provided. The rapid access tool has a self-orienting pull arm pivotally coupled to an elongated shaft and a pull line attachment assembly with a strap or pull line. The method comprises the steps of: forming a hole in the barrier; inserting a portion of the elongated shaft and the pull arm of the rapid access tool through said hole in said barrier; automatically orienting to a deployed state under a force of gravity, after the portion of the elongated shaft has been inserted through the barrier, said pull arm; and when in the deployed state, applying pressure to the barrier to breach the barrier by the pull arm by pulling on the strap or the pull line.

Further details on these embodiments and other possible embodiments including methods for using the rapid access tool are set forth below. As is appreciated by those of ordinary skill in the art, this invention has wide utility in a number of areas as illustrated by the discussion below. These embodiments may be accomplished singularly, or in combination, in one or more of the implementations of this invention.

DESCRIPTION OF THE DRAWINGS

The above and other embodiments, objects, uses, advantages, and novel features of this invention are more clearly understood by reference to the following description taken in connection with the accompanying figures, wherein.

Figures 1A, 1B:
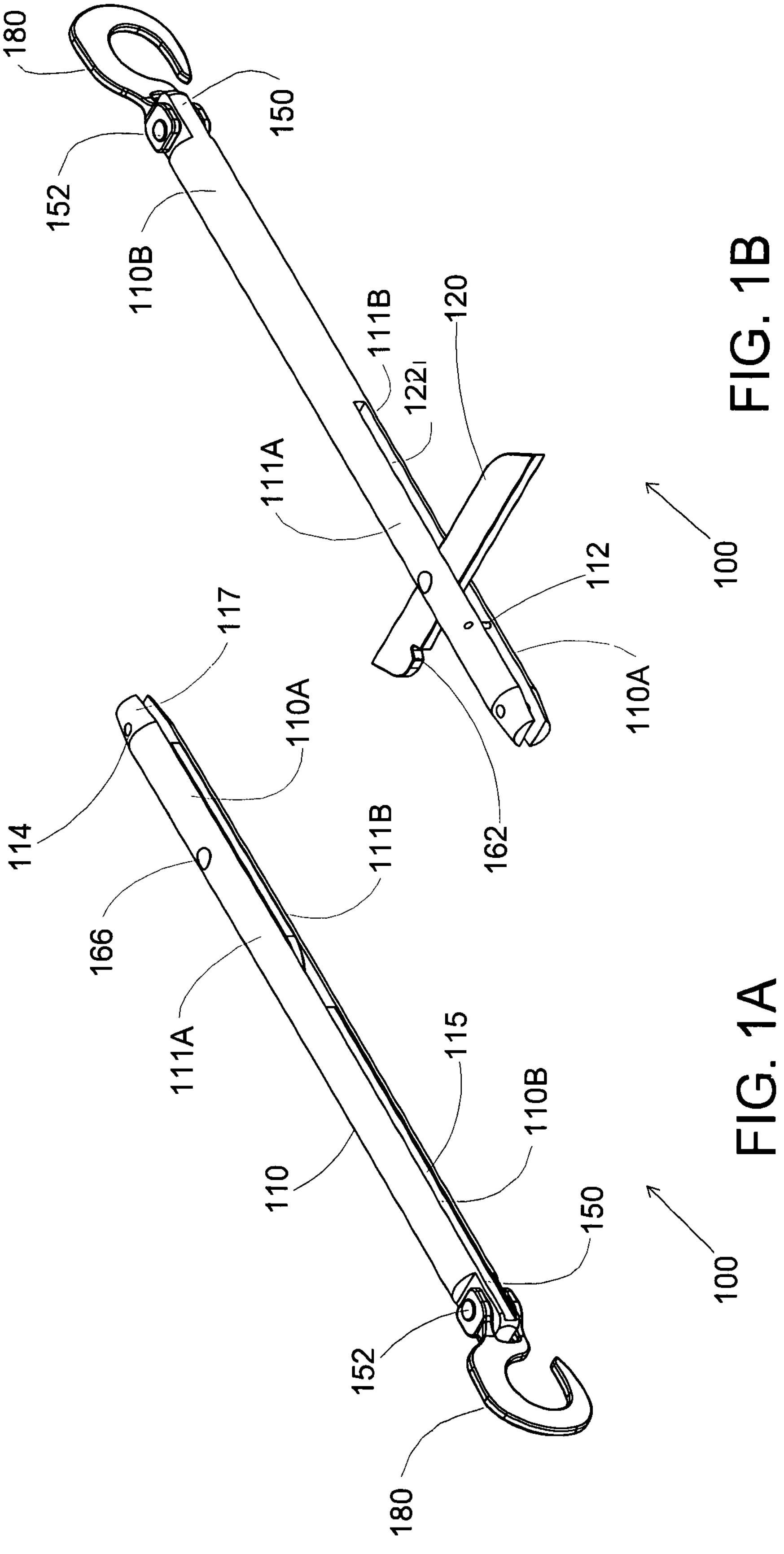
FIGS. 1A and 1B are perspective views of a rapid access tool in a non-deployed state and a deployed state, respectively, according to some exemplary embodiments of the present invention.

The word "exemplary" is used herein to mean "serving as an example, instance, or illustration." Any embodiment, configuration or design described herein as "exemplary" is not necessarily to be construed as preferred or advantageous over other configurations or designs.

DESCRIPTION

This invention now will be described more fully hereinafter with reference to the accompanying drawings, in which exemplary embodiments are shown. This invention may, however, be embodied in many different forms and should not be construed as limited to the embodiments set forth herein; rather these embodiments are provided so that this disclosure will be thorough and complete, and will fully convey the scope of invention to those of ordinary skill in the art. Like numbers refer to like elements throughout. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those of ordinary skill in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalents as those shown herein.

According to exemplary embodiments, the rapid access tool provides a portable rescue tool to remove or otherwise invade ballistic or other difficult to penetrate barrier material (e.g., glass, metal, etc.) in order to gain access to an enclosed chamber, such as, a compartment of a vehicle. The rapid access tool comprises an elongated shaft having a first end and a second end. The first end includes a hole or attachment means to attach a pull line or strap. The second end includes a hinge pin connected to a pull arm that aligns within an aperture of the shaft. Additional features of the rapid access tool include a keeper pin to hold the pull arm in a concealed (non-deployed) orientation wherein the pull arm is configured for self-orienting based on rotation of the elongated shaft. The pull arm is configured to deploy (automatically orient to align a longitudinal axis of the pull arm perpendicular to the longitudinal axis of the elongated shaft) under the force of gravity as the elongated shaft is rotated, moved or otherwise manipulated to at least one particular orientation of the shaft.

A further feature of the rapid access tool is a groove at an opposite side of the elongated shaft from a side of the keeper pin and extends to an aperture configured to conceal the pull arm. The groove allows a retrieval rod to close the pull arm (pivot or swing back to a concealed orientation), if necessary, when the pull arm is deployed behind a barrier. The elongated shaft of the rapid access tool further includes a tapered end for easy insertion of the rapid access tool through ballistic material of a barrier. The rapid access tool may be made of a variety of materials, such as, for example, steel, titanium, other metals, polymers and/or combinations thereof. The material and construction is configured such that the rapid access tool has a tensile strength to withstand 90,000 psi (pounds per square inch).

In addition to the advantages described above, the method, when using the rapid access tool, selects a weak point in the ballistic barrier or system that can be exploited for the purposes of rescue operations. The method involves a non-complex tool (rapid access tool) for use by minimally trained personnel to execute a timely rescue from a complex vehicle or structure. The minimally invasive rescue process reduces the risk of injury or death to victims and rescuers alike. Furthermore, the (breaching) method may facilitate the exchange of communication, fluids, lighting, and other rescue equipment or rations to support or sustain life during periods of prolonged operations.

Referring now to the figures, FIGS. 1A and 1B are perspective views of a rapid access tool (RAT) 100 in a non-deployed state and a deployed state, respectively. The RAT 100 includes an elongated shaft 110 of strong and durable metallic material (e.g. steel, titanium, or composite) or other suitable material (e.g. plastic, polymers, or composites). The RAT 100 comprises, at a first end, a strap attaching means or member 180 configured to attach to an end of a pull line or strap 220 (FIG. 7) and a pull arm 120 in proximity to a second end opposite the first end. In an embodiment, the RAT 100 has a tensile strength to withstand 90,000 psi (pounds per square inch).

In FIG. 1A, the pull arm 120 (FIG. 1B) is in a non-deployed state which corresponds to a concealed orientation or being enclosed within the elongated shaft 110. In FIG. 1B, the pull arm 120 is deployed which corresponds to an open pull arm 120. The pull arm 120 is uniquely configured to be self-orienting and is provided with a notch 162 to automatically latch onto a keeper pin 112 to maintain the concealed orientation under the forces of gravity, when the elongated shaft 110 is in at least one specific orientation.

The elongated shaft 110 has a longitudinal axis. In the illustration of FIG. 1B, the elongated shaft 110 has a closed-pin configuration. More specifically, the elongated shaft 110 includes a first portion 110A and a second portion 110B. The first portion 110A, in an embodiment, is integrally formed with the second portion 110B to form a unitary elongated shaft 110 having the closed-pin configuration. The second portion 110B, in an embodiment, is essentially solid and has formed along one side an elongated groove 115, as best seen in FIG. 1A. The elongated groove 115 extends the length of the second portion 110B and may be used to insert a retrieval rod (not shown) to selectively close the pull arm 120 (e.g. move the pull arm 120 to a concealed or closed-pin orientation), if necessary. For example, in a situation when the force of gravity cannot be used to re-orient the pull arm 120 to a concealed or closed-pin orientation, the retrieval rod can be used to manually close the pull arm 120.

The first portion 110A has an elongated aperture or slot 122 formed therein. The elongated aperture or slot 122 essentially cuts the first portion 110A of the elongated shaft 110 longitudinally in half and forms parallel and overlapping shaft sections 111A and 111B, separated by the elongated aperture or slot 122. The elongated aperture or slot 122 has a closed end. The end opposite the closed end corresponds to the second end of the RAT 100 and has a tapered tip 117. The closed end is closed by the solid surface of the front of the second portion 110B. The elongated aperture or slot 122 is otherwise open along or on all other sides to form a gap between the parallel and overlapping shaft sections 111A and 111B. The closed end of the aperture or slot 122, in an embodiment, is configured to be accessed through the groove 115.

The elongated shaft 110 comprises a coupler 150 configured to attach or couple to the strap attaching means 180. In an embodiment, the strap attaching means 180 is a hook. The coupler 150 includes a coupling pin 152 configured to be received in a hole in the coupler 150. The combination of the coupler 150 and the hook or other strap attaching means 180 is a pull line attachment assembly.

In the exemplary configuration, the hook is a C-shaped hook. However, a D-clip hook or other means of securing a pull line or strap 220 (FIG. 7) may be used. For example, in lieu of coupling a hook to coupler 150, the coupler 150 may be equipped with a hole sufficient to have a hook or D-clip attached directly thereto provided the pull line or strap 220 has the hook or D-clip on its free end. Nonetheless, the strap attaching means 180 may comprise a hole to journal the strap therethrough. For example, a pull line or strap 220 could be fed through a hole in the coupler 150. Thereafter, two ends of the pull line or strap 220 could be used to pull on the RAT 100 about the coupler 150. As can be appreciated, the strap attaching means 180 may have a variety of other different constructions all of which is prohibitive to describe herein.

In operation, the pull line or strap 220 is configured to be coupled or affixed to a vehicle, towing device or other pulling device. As the vehicle or towing device is propelled to pull on the RAT 100, the pull arms 120 when deployed are firmly anchored behind the ballistic material or barrier. As the RAT 100 is pulled, the pull arms 120 apply pressure to the ballistic material or barrier so that it is breached such as, without limitation, causing unsealing or breaking of a frame or seal, breaking of the ballistic material or barrier, etc.

The RAT 100 further includes a keeper pin 112 which is coupled to one or both of the shaft sections 111A and 111B within the elongated aperture or slot 122. A longitudinal axis of the keeper pin 112 is perpendicular to the longitudinal axis of the elongated shaft 110 but is offset or displaced to one side (or in closer proximity to a longitudinal edge) of the elongated aperture or slot 122. The groove 115 is provided along a side of the second portion 110B opposite the one side or longitudinal edge associated with (nearest) the keeper pin 112. The groove 115 is configured to facilitate the insertion of a retrieval rod (not shown) to close or conceal the pull arm 120, when pull arm 120 is deployed behind a substrate, ballistic material, glass, metal or other barrier.

The pull arm 120 is pivotally coupled within the elongated aperture or slot 122 via hinge pin 166. The hinge pin 166 is perpendicular to and aligned with the longitudinal axis of the elongated shaft 110. The keeper pin 112, in an embodiment, is between the supportive pin 114 and the hinge pin 166.

Figure 9:
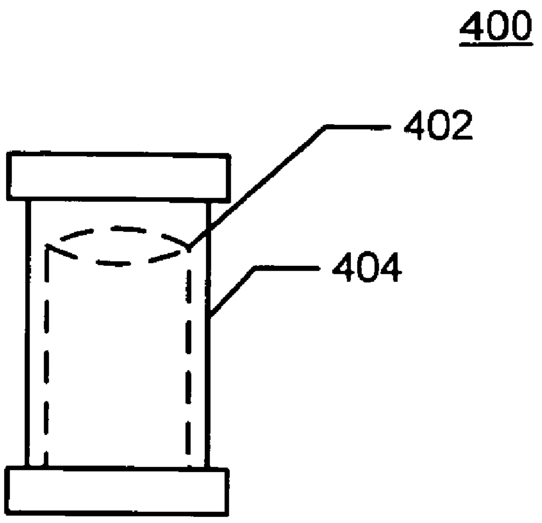
FIG. 9 illustrates an exemplary pin.

Referring also to FIG. 9, an exemplary pin 400 is shown. One or more of the pins (e.g. keeper pin 112, supportive pin 114, and hinge pin 166) described herein may be configured as the pin 400. The pin 400 comprises concentrically mated cylinders 402 and 404 coupled to shaft sections 111A and 111B (FIGS. 1A and 1B). For example, one (female) cylinder 402 would be attached to section 111A and the second (male) cylinder 404 (shown in phantom) would be attached to the section 111B. The second (male) cylinder 404 is configured to be received in and concentric with the one (female) cylinder 402. In an embodiment, the pin 400 is made to support the pulling force exerted when the RAT 100 is being pulled by a vehicle, towing device or other pulling device.

Figure 2:
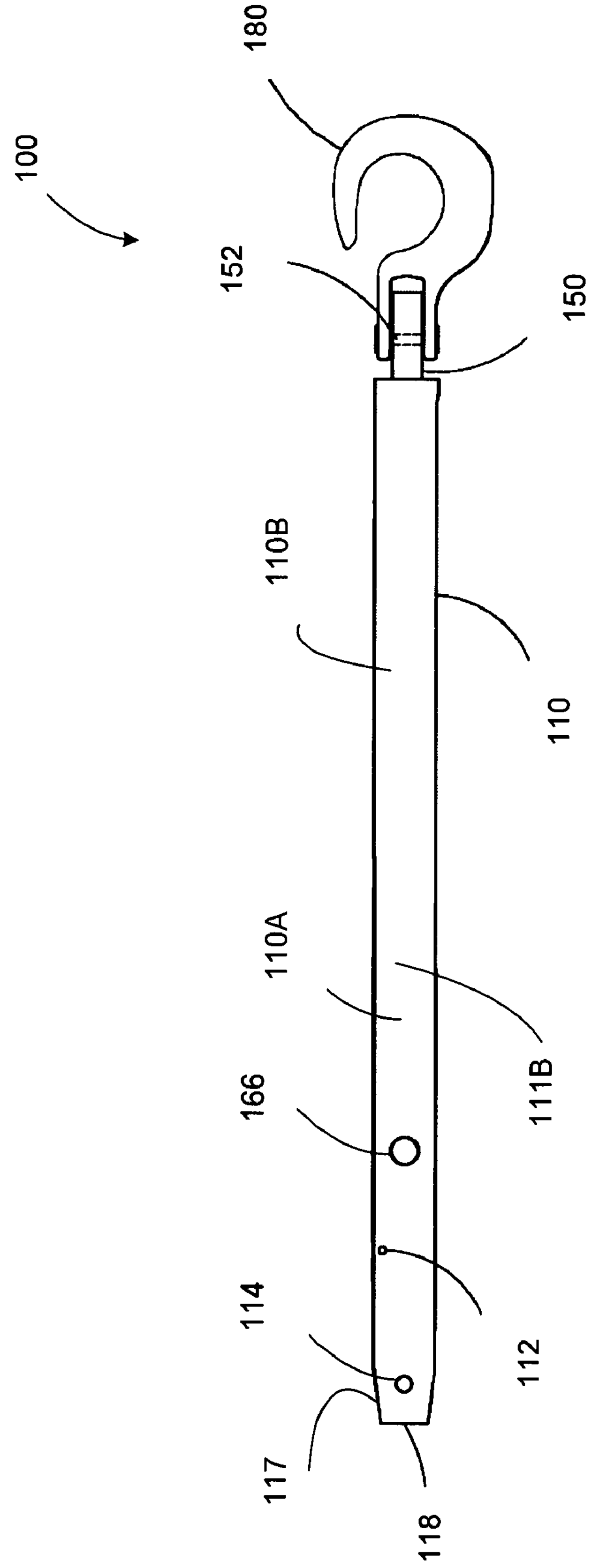
FIG. 2 illustrates a first side view of the rapid access tool in the non-deployed state and with the hook in an alternate position according to some exemplary embodiments of the present invention.

FIG. 2 illustrates a first side view of the RAT 100 in the non-deployed state and with the hook (strap attaching means 180) in an alternate position. FIG. 2 illustrates an alternate orientation of the hook (strap attaching means 180). Nonetheless, the hook may be oriented in a variety of positions. As a point of reference and understanding, assume that the RAT 100 is oriented at 0° or a first predetermined orientation. In the illustration of FIG. 2, the pull arm 120 is shown concealed within the elongated shaft 110. In the first predetermined orientation, under the force of gravity, the pull arm 120 is configured to remain concealed in the elongated aperture or slot 122. In the concealed position, the pull arm 120 is not susceptible to damage and allows the RAT 100 to be deployed through a small hole. In FIG. 2 the second end of the RAT 100 is denoted by the numeral 118. Also, the shaft section 111B is shown.

The pull arm 120 has a width (non-longitudinal length or shortest side) that is configured to closely track the diameter of the elongated shaft 110. In the non-deployed state, the pull arm 120 is concealed within the elongated aperture or slot 122.

In the concealed orientation, a longitudinal axis of the pull arm 120 is longitudinally aligned to be parallel with a longitudinal axis of the elongated shaft 110. The strap attaching means 180 is configured to attach to a pull line, chain, or strap 220. The strap attaching means 180 includes at least two engagement members coupled to the hook, each of the two engagement members having a first end attached to the coupler 150 via coupling pin 152. In an embodiment, the hook may be configured to pivot about coupling pin 152.

The elongated shaft 110 is divided in half. In the first predetermined orientation, the longitudinal openings (meaning those openings that would allow the pull arm to swing in and out of the elongated aperture or slot 122) of the elongated aperture or slot 122 are positioned at 90° and 270° of a circular profile. The keeper pin 112 is located at substantially 90° of the circular profile. In other words, the longitudinal axis of hinge pin 166 and keeper pin 112 are oriented to traverse an axis aligned with 0° and 180° (or the horizon). The longitudinal axis of the keeper pin 112 is parallel to the horizon. Thus, when carrying the RAT 100 in the first predetermined orientation, under the force of gravity the keeper pin 112 prevents the pull arm 120 from rotating, swinging or deploying.

It is important to note that in the illustration of FIG. 2, the elongated shaft 110 is oriented such that the keeper pin 112 is positioned above the horizon (corresponding to 0° and)180°.

Figure 3:
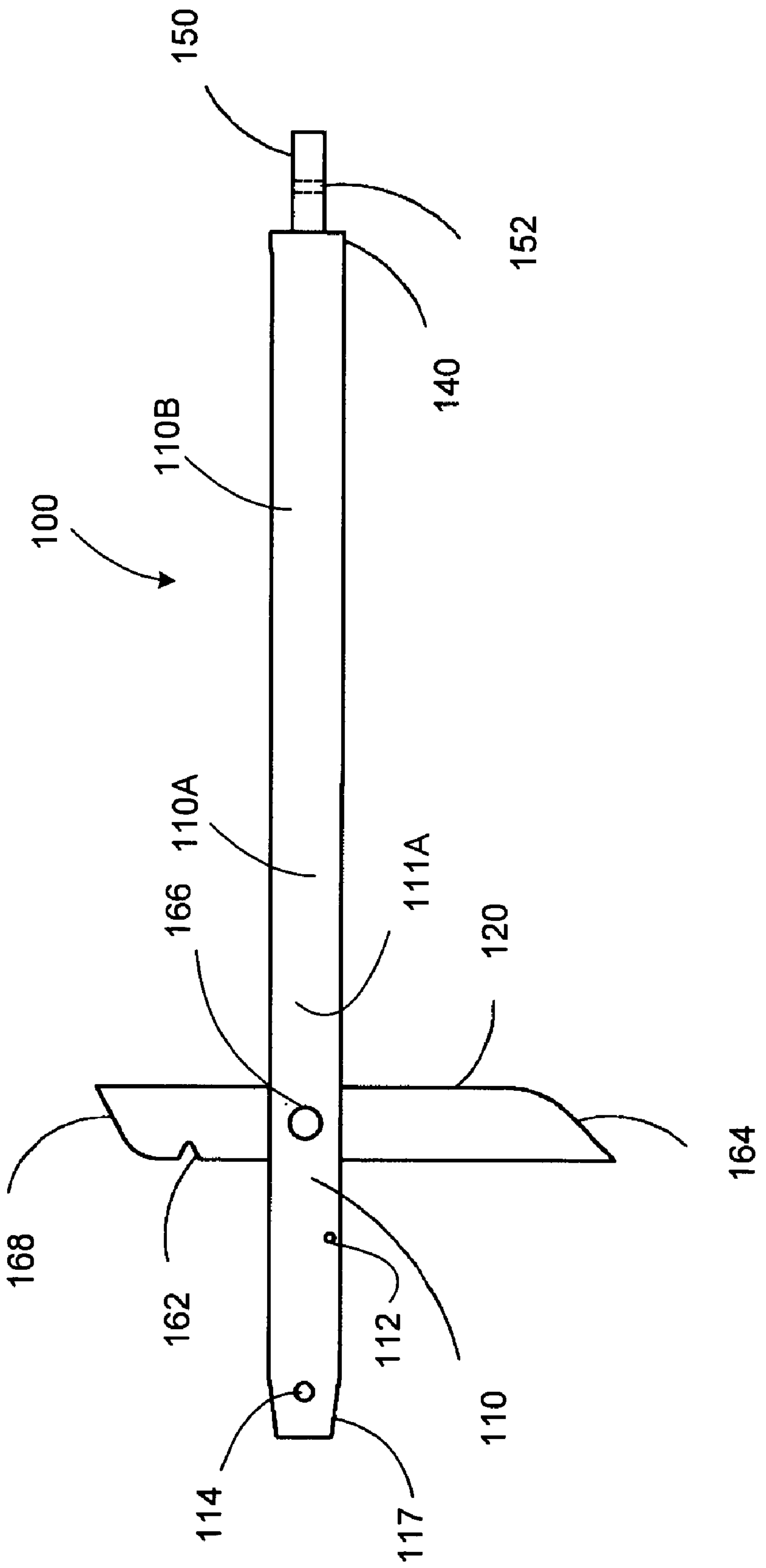
FIG. 3 illustrates a second view of the rapid access tool in the deployed state and with the hook removed according to some exemplary embodiments of the present invention.

The unique properties of the pull arm 120 will be more evident based on the description of FIG. 3. Thus, with respect to FIG. 3, a second view of the RAT 100 is shown in the deployed state and with the hook (strap attaching means 180) removed. As a point of reference and understanding, assume that the RAT 100 is rotated 180°, with respect to the first predetermined orientation (FIG. 2), to a second predetermined orientation. Thus, the first side view and second side view are different halves of the elongated shaft 110. Here, shaft section 111A is shown. In the illustration of FIG. 3, the pull arm 120 is shown deployed. The pull arm 120 is self-orientating such that when rotating the RAT 100 from the 0° orientation of FIG. 2 approximately 180° to the orientation shown in FIG. 3, the force of gravity exerted on the pull arm 120 causes the pull arm to automatically unlatch from the keeper pin 112 and deploy.

In the second predetermined orientation, the longitudinal openings of the elongated aperture or slot 122 are also positioned at 90° and 270° of the circular profile with the keeper pin 112 located at substantially 270°. The longitudinal axis of hinge pin 166 and keeper pin 112 are oriented to traverse an axis aligned with 0° and 180° (or the horizon). The longitudinal axis of the keeper pin 112 is parallel to the horizon but the keeper pin 112 is positioned below the horizon (corresponding to 0° and)180°.

In other words, the forces of gravity allow the pull arm 120 to rotate down and vertically orient such that a longitudinal axis of the pull arm 120 is perpendicular to a longitudinal axis of the elongated shaft 110. The force of gravity acting on the pull arm 120 automatically unlatches the notch 162 from keeper pin 112.

In FIG. 3, the pull arm 120 is shown deployed such that the orientation of the pull arm is longitudinally perpendicular (or essentially longitudinally perpendicular) to the longitudinal axis of the elongated shaft 110. The pull arm 120 is capable of being pivoted, rotated or swung to a deployed state, as best seen in FIGS. 1B and 3.

In an embodiment, the pull arm 120 is not pivotally connected about a midpoint with respect to a longitudinal length of the pull arm 120. Instead, the pivotal connection is displaced longitudinally to form first and second arm sections 164 and 168, the first and second arm sections 164 and 168 having different lengths with respect to the pivot point of hinge pin 166. The first arm section 164 is longer than the second arm section 168. Thus, when the force of gravity is exerted on the pull arm 120, the longitudinal displacement of the pivot point on the pull arm causes the heavier side, which corresponds to the longer section 164, to automatically vertically orient downward thereby effectuating the unlatching and lifting of the shorter section 168 (lighter side) vertically upward.

In an embodiment, the free ends of the first and second arm sections 164 and 168 are slanted to form a parallelogram shape and provide for precise movement within the aperture or slot 122 as the pull arm 120 is deployed. In an embodiment, the notch 162 of the pull arm 120 is formed in a (leading) edge of the second (shorter) arm section 168. The notch 162 is configured to receive therein the keeper pin 112 to stop the free movement, rotation, swing motion, or pivoting motion of the pull arm 120. In an embodiment, the keeper pin 112 is configured to assist in concealing the pull arm 120 within the aperture or slot 122 wherein when the pull arm 120 is concealed within the aperture or slot 122, the keeper pin 112 is received in or latches with the notch 162.

In operation, rotating the elongated shaft 110 such that the keeper pin 112 is below the horizon deploys the pull arm 120. Intermediary positions or angles of rotation clockwise or counter-clockwise work to assist in the self-orienting feature effectuated by the force of gravity to achieve deployed and non-deployed states. The groove 115 can be used with a retrieval rod (not shown) as a manual means to cause the pull arm 120 to be closed or moved to a non-deployed state, as needed. In another embodiment, the groove 115 could be used as an access to manually deploy the pull arm, if necessary.

In FIG. 3, the hook (strap attaching means 180) is removed. The first end of the RAT 100 is denoted in FIG. 3 as the number 140. The coupler 150 has a smaller diameter than the elongated shaft 110. The coupler 150, in an embodiment, may be flat or configured to be used as chisel or impact device. For example, the coupler 150 or the first end of the elongated shaft 110 could be used to form a hole in the ballistic material or other barrier. A hammer could be used to apply an impact force directly on or to end 118 (FIG. 2). The impact force applied to end 118 (FIG. 2) would be channeled to the first end 140 or the coupler 150 to pierce through the ballistic material or other barrier. In an embodiment, the piercing would create a hole, crack or other weak point.

Figure 5:
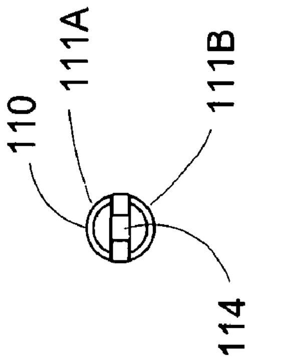
FIG. 5 illustrates an end view of the elongated shaft according to some exemplary embodiments of the present invention.
Figure 4:
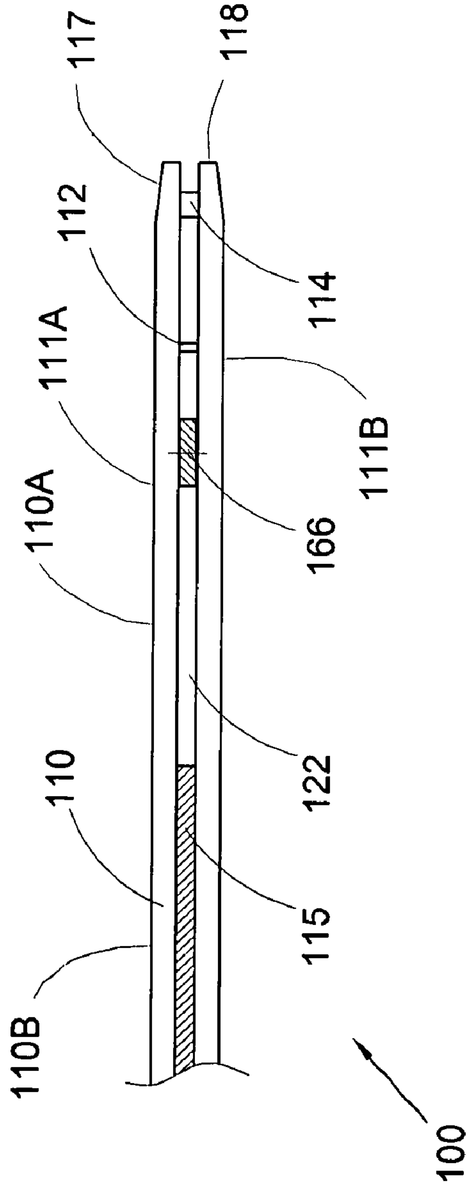
FIG. 4 illustrates a partial third side view of an elongated shaft of the rapid access tool according to some exemplary embodiments of the present invention.

Referring now to FIGS. 4 and 5, a partial third side view and an end view of the elongated shaft 110 are shown. The second end 118 of the elongated shaft 110 or first portion 110A has a tapered tip 117. In an embodiment, the tapered tip 117 has a supportive pin 114 coupled perpendicularly to the shaft sections 111A and 111B. The supportive pin 114 has a longitudinal axis which is essentially perpendicular to and aligned with the longitudinal axis of elongated shaft 110. The supportive pin 114 is configured to secure the shaft sections 111A and 111B together at a location corresponding to the tapered end 117 of the shaft 110. In an embodiment, the tapered profile of the tapered end 117 facilitates easy insertion of the elongated shaft 110 of the RAT 100 into a drilled hole formed in a barrier, security barrier or other ballistic material to be removed or breached.

The supportive pin 114 is configured to strengthen the second end 118 to bear the force, applied the shaft sections 111A and 111B through an insertion or drilling process, as will be described later. The supportive pin 114 would also block any matter, particles, material from being lodged between shaft sections 111A and 111B or within the elongated aperture or slot 122. Lodged matter or material could block, hinder or obstruct the self-orienting feature of the pull arm 120 to automatically deploy or orient to a non-deployed state. The groove 115 is shown on the third side view. The third side view (third predetermined orientation) corresponds to the longitudinal axis of the keeper pin 112, supportive pin 114 and hinge pin 166 being oriented perpendicular to the horizon. The third side view can be achieved by rotating the elongated shaft 110 approximately 90° in a counter-clockwise direction with respect to the first predetermined orientation (FIG. 2). Likewise, the third side view can be achieved by rotating the elongated shaft 110 approximately 270° counter-clockwise direction with respect to the second predetermined orientation (FIG. 3). Nonetheless, the third side view can be achieved by rotating the elongated shaft 110 clockwise.

In the third predetermined orientation of FIG. 4, the pull arm (not shown) could be in a non-deployed state and may stay in the non-deployed state under the force of gravity. In other words, the force of gravity applied to the pull arm may be parallel to the longitudinal axis of rotation when the elongated shaft 110 or RAT 100 is oriented in the third predetermined orientation of FIG. 4. Gravity alone, generally, would not cause rotation of the pull arm 120 in the third predetermined orientation. Instead, the force of gravity would tend to cause the pull arm 120 to remain stationary in a point of rest.

Likewise, in the third predetermined orientation of FIG. 4, the pull arm (not shown) could be in a deployed state and may stay in the deployed state under the force of gravity since the pull arm would be oriented substantially parallel to the longitudinal axis of rotation when the elongated shaft 110 or RAT 100 is oriented in the third predetermined orientation of FIG. 4.

FIG. 5 is an end view of the elongated shaft 110 but does not include the groove 115 or the keeper pin 112. The groove 115 may be an optional feature.

Figure 6:
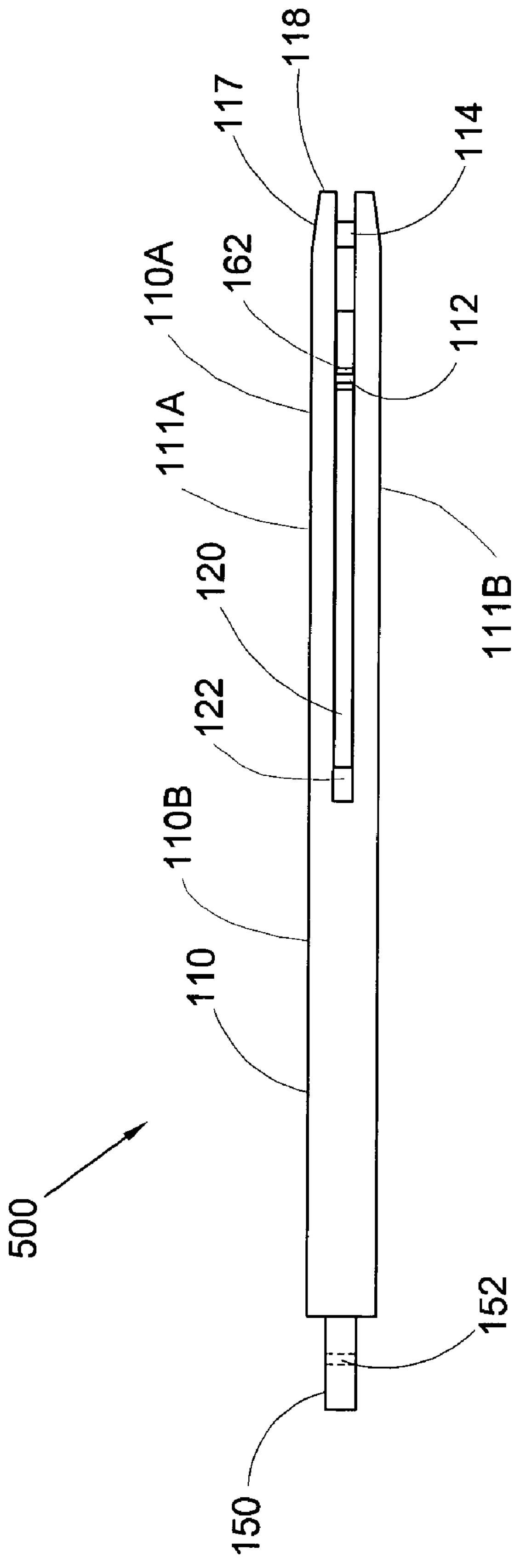
FIG. 6 illustrates a fourth side view of the rapid access tool in the non-deployed state and with the hook removed according to some exemplary embodiments of the present invention.

FIG. 6 illustrates a fourth side view of the RAT 100 in the non-deployed state and with the hook removed. The fourth side view can be achieved by rotating the elongated shaft 110 approximately 270° in a counter-clockwise direction with respect to the first predetermined orientation (FIG. 2). Likewise, the fourth side view can be achieved by rotating the elongated shaft 110 approximately 270° counter-clockwise direction with respect to the second predetermined orientation (FIG. 3). Nonetheless, the fourth side view (fourth predetermined orientation) can be achieved by rotating the elongated shaft 110 clockwise. In the fourth predetermined orientation of FIG. 6, the pull arm 120 is shown in a non-deployed state and may stay in the non-deployed state under the force of gravity. In other words, the force of gravity applied to the pull arm 120 is generally parallel to the longitudinal axis of rotation when the elongated shaft 110 or RAT 100 is oriented in the fourth predetermined orientation of FIG. 6.

In the fourth predetermined orientation of FIG. 6, the pull arm 120 could be in a deployed state (opposite the state shown) and may stay in the deployed state under the force of gravity. In other words, the force of gravity applied to the pull arm 120 is generally parallel to the longitudinal axis of rotation when the elongated shaft 110 or RAT 100 is oriented in the fourth predetermined orientation of FIG. 6.

Figure 10:
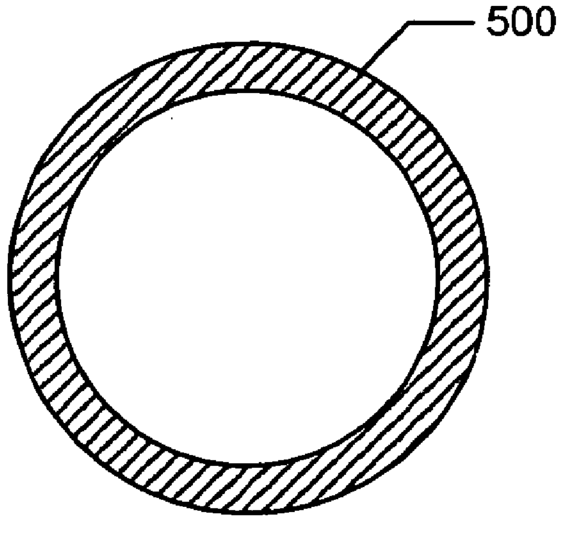
FIG. 10 illustrates a supplemental band.

FIG. 10 illustrates a supplemental band 500 which may be made of resilient and flexible material or elastic material, such as rubber. The band 500 would be used to keep the pull arm 120 concealed such as when the RAT 100 is stored away or at other times. The band 500 can be easily removed when the RAT 100 is ready to be used.

In lieu of an elastic band, the band 500 may be some other strapping member that can be easily removed. For example, ends of the strap could be fastened via a hook and loop type fastening system, such as Velcro™.

Figure 7:
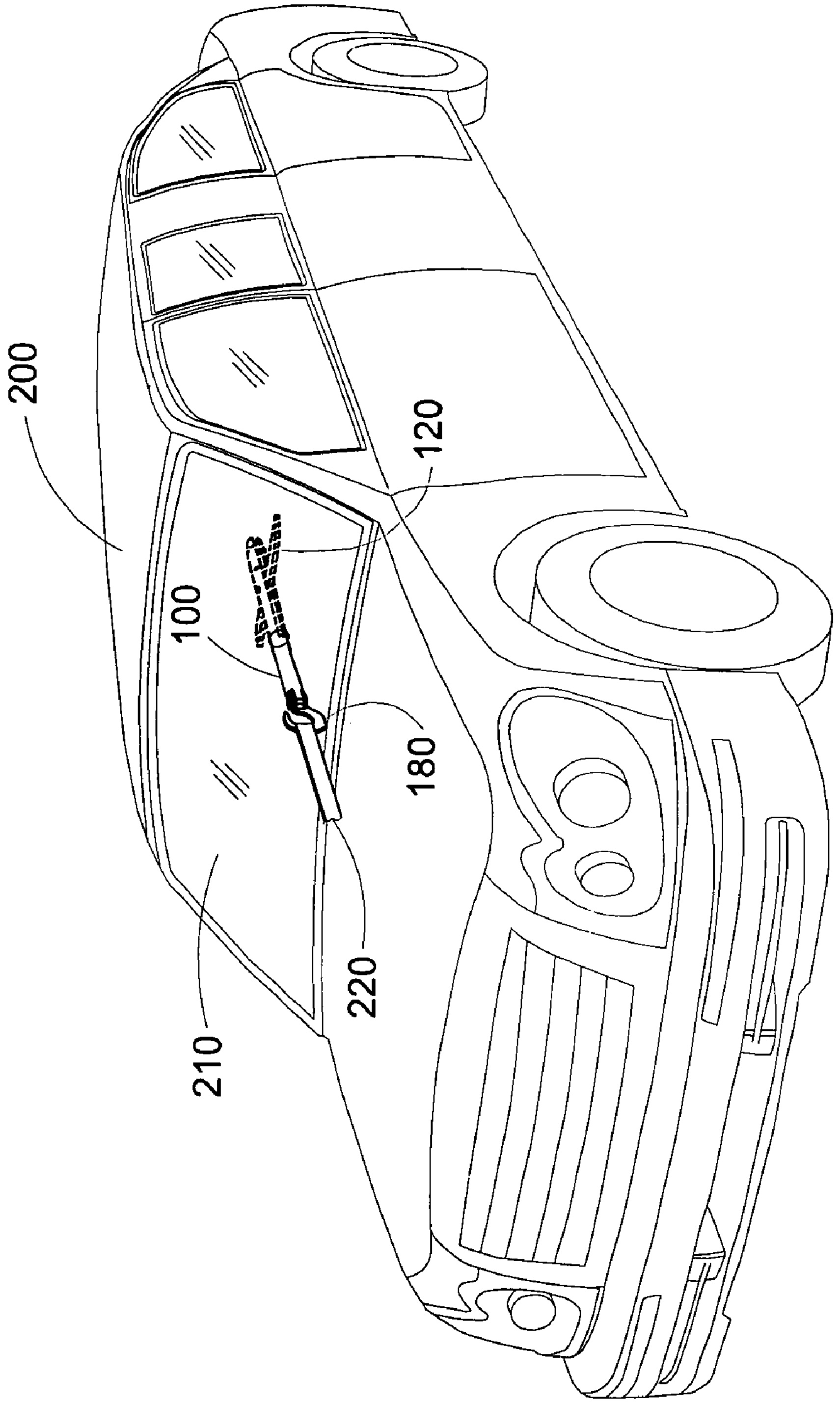
FIG. 7 illustrates the rapid access tool in a deployed state and being used to remove a windshield according to some exemplary embodiments of the present invention.
Figure 8:
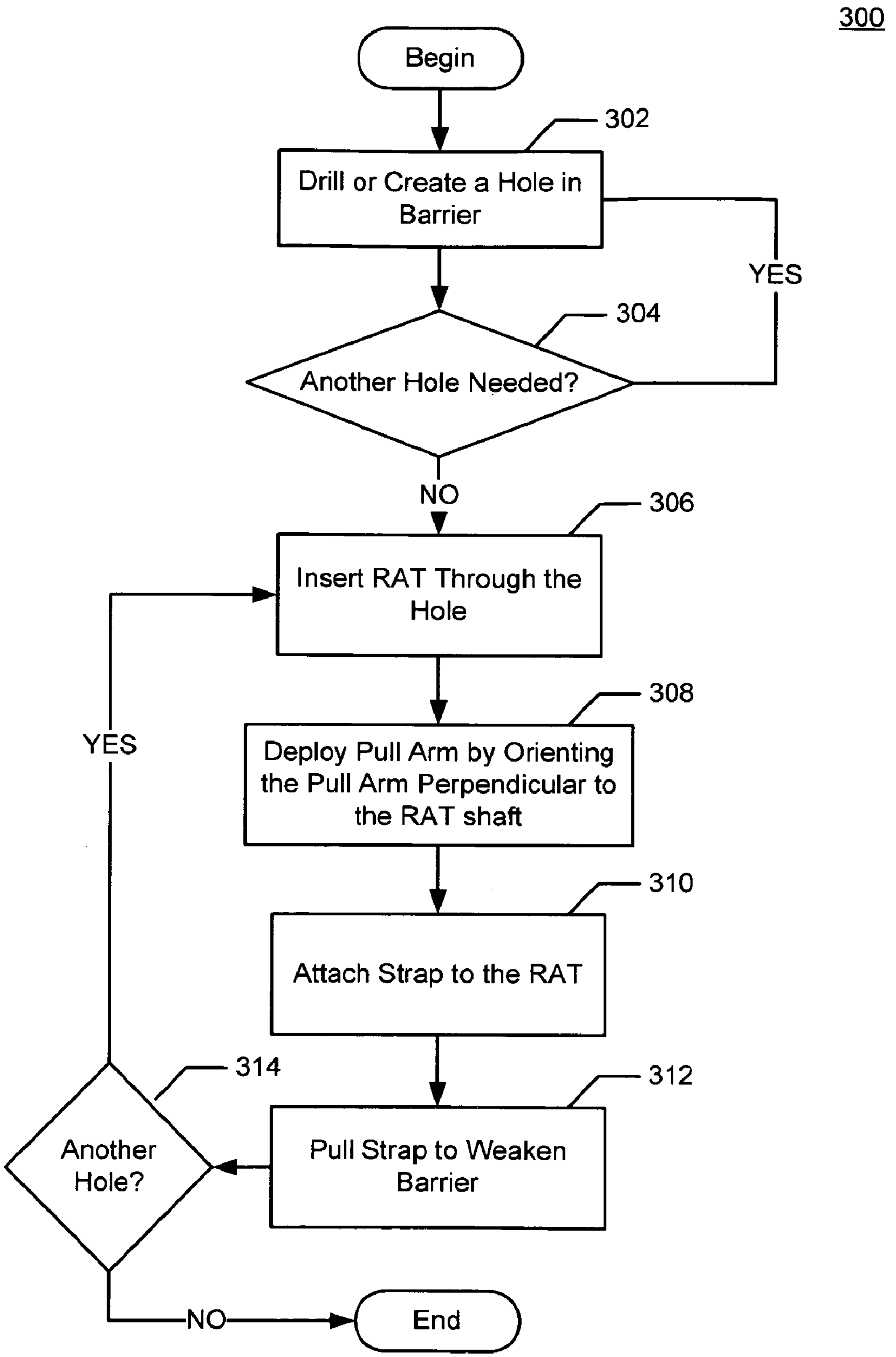
FIG. 8 illustrates a flow chart of a process for using the rapid access tool according to some exemplary embodiments of the present invention.

The operation of the RAT 100 will now be described in relation to FIGS. 7 and 8. FIG. 7 illustrates the RAT 100 in a deployed state and being used to remove a windshield or barrier 210 of an automobile or vehicle 200. FIG. 8 illustrates a flow chart of a process 300 for using the RAT 100 to breach or remove a windshield or barrier 210 of FIG. 7. In various configurations, the blocks of the process 300 described herein are performed in the depicted order or at least two of these blocks or portions thereof may be performed contemporaneously, in parallel, or in a different order. Furthermore, one or more of the blocks may be omitted.

The process 300 begins with block 302 where a hole is drilled or formed in the windshield or barrier 210. The barrier 210 may be made of ballistic material. In the illustration, the barrier is a windshield 210 of a vehicle 200. Depending on the material, more than one hole may be needed. Thus, at block 304 a determination is made whether more holes are needed. If the determination is "YES," the process 300 loops back to block 302. The user would determine a new location of the second hole to be drilled in the barrier 210.

Once the last hole is drilled or formed, at block 302, the determination at block 304 would be "NO." Hence, block 304 is followed by block 306. At block 306, the RAT 100 is inserted through one of the drilled or created holes in barrier 210. The RAT 100 is slid or inserted through the hole a sufficient distance so that the pull arm 120, when non-deployed, has sufficient clearance to rotate to a deployed state. This can be accomplished when the RAT 100 is slid or inserted so that the aperture or slot 122 has passed through the hole. At block 308, the pull arm 120 is deployed such that the pull arm 120 is essentially perpendicular to the longitudinal axis of the elongated shaft 110, as best seen in FIG. 7. In FIG. 7, that portion of the RAT 100 including the deployed pull arm 120 inserted through the barrier 210 is shown in phantom. When the pull arm 120 is deployed, the longitudinal axis of the pull arm 120 is configured to be parallel with the ballistic material or barrier surface. At block 310, the pull line or strap 220 is attached to the coupler 150 of the RAT 100. At block 312, the strap is pulled such as via another vehicle, tow device or pull device to weaken or breach the windshield or barrier 210.

Block 312 is followed by block 314 where a determination is made whether any more holes have been drilled or created. If the determination is "NO," then the process 300 ends. However, if the determination is "YES," then the process 300 loops back to block 306. Blocks 306-312 may be repeated for each hole. However, block 310 may be optional in subsequent loops once the pull line or strap 220 is attached to strap attaching means 180 or hook. As can be appreciated, the pull arms 120, when deployed behind the barrier or ballistic material to be breached, provide an anchor to which a force is leveraged against as the RAT 100 is pulled.

In an embodiment, a one-inch (1") diameter hole may be drilled completely through the ballistic material to provide a pathway for inserting the RAT 100. The diameter of the RAT 100 is slightly smaller than the one-inch diameter hole. Nonetheless, other diameters may be used. The tapered end 117 of the RAT 100 along with the reaming of the hole during drilling allows the RAT 100 to be inserted through the ballistic material without resistance.

The RAT 100 may includes markings to indicate the necessary positions of the elongated shaft 110 to allow the pull arm 120 to deploy. Once the pull arm 120 is deployed (opened), the shaft 110 can be rotated in any direction to allow for the most favorable angle to connect the tow strap 220 to the hook. The pull arm 120 can be placed against the ballistic material in any direction and will not close unless the retrieval rod is inserted through the provided groove 115 to close the arm 120. The elongated shaft 110 or RAT 100 may have marking to instruct the closing of the arm 120 with the retrieval rod (not shown).

The pull line or strap 220 may be attached to a pulling device. The pulling device may include a towing vehicle, a winch, another mechanical device, etc. The pulling device should exert the necessary force to remove or displace the ballistic material.

According to exemplary embodiments, the apparatus (also referred to herein as the "rapid access tool" or the "RAT") is used to assist in the removal of a ballistic and/or other security barrier (e.g., glass, metal, etc.) for access to an enclosed chamber, such as, for example, a compartment of a vehicle, a room of a building or other barriers, doors or walls to buildings.

The RAT 100 can be used by rescue providers to remove a ballistic and/or security barrier. The rescue provider utilizes a drill or other means to penetrate the ballistic and/or safety barrier. In an embodiment, the location of the hole to be drilled or created is selected by calculating a weakest position or by calculating one or more positions that will facilitate access. For example, for a windshield or barrier 210 on the door of a vehicle 200, the windshield or barrier 210 is usually secured by a frame. A side portion of the windshield could have an A-frame to a front windshield and the opposite side portion might have a B-frame to the door. The rescue provider could select an upper location skewed towards the B frame to drill. After the hole is drilled or created, the tapered end 117 of the RAT 100 is inserted into the hole or orifice and the pull arm 120 is deployed such that a longitudinal axis of the pull arms 120 are parallel with the barrier or ballistic material.

Tension is used to maintain the position of the pull arm 120 in the deployed state. After positioning the pull arm, the RAT 100 is pulled such that the ballistic material or barrier is pulled off or broken away, such as removing a ballistic windshield from its casing or seal, to provide access into the compartment.

According to some of the exemplary embodiments, the RAT 100 may be constructed in a variety of sizes to facilitate removal of barriers having different thicknesses and/or of different compositions. Other embodiments include simultaneous use of a plurality of RATs 100 to exert one or more forces to pull the barrier, wall, door, window, glass, etc. and facilitate access to a chamber, room of a building or other walls and barriers. Likewise a plurality of straps or pull lines could be attached and used simultaneously to generate a plurality of pressure or pulling forces simultaneously on a barrier via the plurality of RATs 100.

A barrier is defined as a wall, door, window, glass, structure of ballistic material or other material used to form a barrier, enclosure, or chamber.

While the exemplary configurations shown above show a unitary elongated shaft 110 and coupler 150, other configurations may include an elongated shaft (e.g. shaft 110) divided longitudinally into removable sections so that one or more of the sections can be selectively removed. For example, the coupler 150 may be a separate section from the elongated shaft 110. In an alternate embodiment, the first portion 110A may be a separate and removable section from the second portion 110B. Thus, when the RAT 100 is used, damaged portions may be removed and replaced, as needed.

In a further exemplary embodiment, the RAT 100 may have a coating. The coating may coat all surfaces of the elongated shaft 110, pull arm 120, coupler 150, etc.

According to still further exemplary embodiments, the RAT 100 may be packaged in a small hard case that can be easily stowed in most any vehicle. The following equipment may be packaged with the RAT 100 to carry out the method of the invention. The other packaged elements or tools needed for extrication and such packaging provides one container for immediate use. The exemplary packaging includes a drill or drilling device, 2-drill bits, a battery pack, an extra battery and/or battery charger, the RAT 100, safety glasses, 2-2"×30' tow straps, written operating instructions, safety warnings, and a block for connecting tow straps inside a vehicle to establish a tow point.

As can be appreciated, the RAT 100 and process 300 described above address the above needs and others by providing a portable RAT 100 and a corresponding method for using the RAT 100 in order to significantly reduce the amount of time needed to gain access to vehicles or structures and to significantly reduce rescue times. Furthermore, the RAT 100 and associated method solve some of the above problems by doing away with the need for specially trained and heavily-equipped personnel and by eliminating prolonged extrication operations when rescuing an individual from a structure composed of ballistic or other difficult to breach material.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tool comprising:

an elongated shaft having a longitudinal axis and a first portion with a first end and a second portion with a second end, the second portion having an elongated aperture or slot;

a pull line attachment assembly coupled to the first end, the pull line attachment assembly being configured to couple to a pull line or strap;

a pin coupled to the elongated shaft within the elongated aperture or slot; and a self-orienting pull arm pivotally coupled within the elongated aperture or slot and being configured to automatically latch to the pin to conceal and hold the self-orientating pull arm, when in the elongated shaft is in a first predetermined orientation, and being configured to automatically orient to a deployed state from the first predetermined orientation under a force of gravity when the elongated shaft is rotated to a second predetermined orientation, the pull arm, when concealed, has a longitudinal axis which is parallel with the longitudinal axis of the elongated shaft and, when in the deployed state, the longitudinal axis of the pull arm is angled greater than 0° with respect to the longitudinal axis of the elongated shaft and wherein the pull arm comprises a notch formed in an edge of the pull arm, the notch being configured to latch on to or receive therein the pin.

2. The tool according to claim 1, wherein the second end has a tapered profile.

3. The tool according to claim 1, further comprising a supportive pin coupled to the second portion within the elongated aperture or slot in proximity to the second end, the supportive pin providing strength to the second end.

4. The tool according to claim 1, wherein the pull arm has a parallelogram shape.

5. The tool according to claim 4, wherein the pull line attachment assembly includes a hook pivotally coupled to the first end.

6. The tool according to claim 5, further comprising a hinge pin coupled within the elongated aperture or slot and to the pull arm, wherein the hinge pin is longitudinally displaced along a length of the pull arm.

7. The tool according to claim 1, wherein the elongated shaft has a unitary construction with a close pin configuration.

8. The tool according to claim 1, wherein second portion comprises a first shaft section and a second shaft section separated by a gap, the first shaft section is parallel to and overlapping the second shaft section and wherein a distance between the first shaft section and the second shaft section forms the elongated aperture or slot.

9. The tool according to claim 8, wherein the elongated shaft is constructed of a material comprising one of:

titanium;

metal;

man-made material;

natural material;

polymer; and plastic.

10. The tool according to claim 1, wherein the elongated shaft is configured with a tensile strength to withstand 90,000 psi.

11. A rapid access tool comprising:

an elongated shaft having a longitudinal axis;

a pull line attachment assembly coupled to the elongated shaft, the pull line attachment assembly being configured to couple to a pull line or strap; and a self-orienting pull arm pivotally coupled within the elongated shaft and being configured to automatically latch and be concealed within said elongated shaft and being configured to automatically orient to a deployed state under a force of gravity after the elongated shaft has been inserted through a barrier, the pull arm when in the deployed state is configured to apply pressure to the barrier to breach the barrier when a pulling force is applied to the pull line attachment assembly and wherein the pull arm comprises a notch formed in an edge of the pull arm, the notch being configured to latch on to or receive therein a keeper pin.

12. The tool according to claim 11, wherein the elongated shaft comprises a first portion with a first end and a second portion with a second end, the second portion having an elongated aperture or slot and the second end has a tapered profile.

13. The tool according to claim 12, further comprising a supportive pin coupled to the second portion within the elongated aperture or slot in proximity to the second end, the supportive pin providing strength to the second end.

14. The tool according to claim 11, wherein the pull arm has a parallelogram shape.

15. The tool according to claim 14, wherein under a force of gravity the keeper pin prevents the pull arm from rotating, swinging or deploying.

16. The tool according to claim 15, further comprising a hinge pin coupled within the elongated aperture or slot and to the pull arm, wherein the hinge pin is longitudinally displaced along a length of the pull arm.

17. The tool according to claim 11, wherein the elongated shaft has a unitary construction with a close pin configuration.

18. A method of breaching a barrier of an enclosed chamber using a rapid access tool having a self-orienting pull arm pivotally coupled to an elongated shaft and a pull line attachment assembly with a strap or pull line, the method comprising the steps of:

forming a hole in the barrier;

inserting a portion of the elongated shaft and the pull arm of the rapid access tool through said hole in said barrier wherein the pull arm comprises a notch formed in an edge of the pull arm, the notch being configured to latch on to or receive therein a keeper in to prevent the pull arm from rotating, swinging or deploying;

automatically orienting to a deployed state under a force of gravity, after the portion of the elongated shaft has been inserted through the barrier, said pull arm; and when in the deployed state, applying pressure to the barrier to breach the barrier by the pull arm by pulling on the strap or the pull line.

19. The method of claim 18, further comprising:

forming a plurality of holes in the barrier; and inserting, in each hole of the plurality of holes, a portion of an elongated shaft and a pull arm of a respective different one rapid access tool.

20. The method according to claim 18, wherein the barrier comprises ballistic material.

* * * * *

UNITED STATES PATENT AND TRADEMARK OFFICE

CERTIFICATE OF CORRECTION

PATENT NO. : 7,707,700 B1

APPLICATION NO. : 12/462028

DATED : May 4, 2010

INVENTOR(S) : Troy Hunter Lapetina

It is certified that error appears in the above-identified patent and that said Letters Patent is hereby corrected as shown below:

On the Title page, item 76 INVENTOR, change "TroyHunter Lapetina" to -- Troy Hunter Lapetina --.

Signed and Sealed this

Second Day of November, 2010

David J. Kappos

*Director of the United States Patent and Trademark Office*